United States Patent [19]
Merbach

[11] 4,334,266
[45] Jun. 8, 1982

[54] NUMERICAL CONTROL SYSTEM WITH FOLLOWING ERROR MONITOR
[75] Inventor: Paul C. Merbach, Saxonburg, Pa.
[73] Assignee: Westinghouse Electric Corp., Pittsburgh, Pa.
[21] Appl. No.: 142,521
[22] Filed: Apr. 21, 1980
[51] Int. Cl.³ .............................................. G05B 19/18
[52] U.S. Cl. ..................................... 364/167; 364/175
[58] Field of Search ......................... 364/110, 106, 116

[56] References Cited
U.S. PATENT DOCUMENTS 3,798,430  3/1974  Simon et al. ..................... 364/116 X
3,996,454  12/1976  Froyd .................................. 318/565
4,096,770  6/1978  Tanner ............................ 364/110 X Primary Examiner—David H. Malzahn
Attorney, Agent, or Firm—E. F. Possessky

[57] ABSTRACT

A following error monitoring system for detecting axis positioning failure modes in a numerical control system and causing a cessation of movement as a result of the detecting of such failure mode. The system comprises an integration means and a time delayed negative feedback of the output of the integration means provides a "predicted following error" signal which is used to provide a comparison to a "error threshold signal" for determining unacceptable axis positioning deviation.

10 Claims, 4 Drawing Figures

NUMERICAL CONTROL SYSTEM WITH FOLLOWING ERROR MONITOR

BACKGROUND OF THE INVENTION

1. Field of the Invention

This invention relates to machine tools and, in particular, to a system for detecting error in the positioning of a machine tool and for stopping machine tool operation before the mispositioning error causes destruction or damage of the part under manufacture.

2. Description of the Prior Art

Machine tools are well known in the art. They are used extensively, for example, by aircraft manufacturers to construct precision frame members used in the air frames of general purpose and military aircraft. Because of their precise construction, individual parts manufactured on the machine tools for which the invention disclosed hereinafter finds application represent a substantial economic investment.

Most computer operated machine tool devices provide some form of servo error detection on an individual axis basis. Commonly utilized servo error detection circuitry utilized in conjunction with those devices use the electronic measuring of a "following error" in order to determine machine positioning malfunction. A malfunction is detected only when the "following error" is larger than some predetermined "threshold error", generally on the order of 0.100 to 0.200 inches or larger. Such a magnitude of positioning malfunction can destroy or severely damage the workpiece being machined unless the machinery operation is immediately ceased.

An improved monitoring system has been developed which checks the magnitude of the "actual following error" value against a "predicted following error" value based on velocity of the slide holding the particular milling tool. While this latter device may detect positioning error an order of magnitude smaller, i.e., 0.010 inches, the system checks only the performance of the servo electronics, and does not take into account errors in the input command decoding logic. Additionally, both of the above systems depend on the tool's existing feedback system in order to perform their checks. Consequently, a number of malfunctions still may occur resulting in loss of machine time and in loss of material.

SUMMARY OF THE INVENTION

A command signal determines the position of one or more moving parts of a machine or other device. A following error monitoring system comprises a first integration means for integrating a function of the command signal and for providing an output signal indicative of a "predicted following error". Time delay means are included for delaying in time the output of the first integration means and for providing a delay signal indicative thereof. Negative feedback means are provided for feeding back the delay signal of the time delay means to the first integration means.

More specifically, a position loop implemented in storage registers of a digital computer controls the position of parts of a machine. The negative feedback means including a summing function and the integration means of the following error monitoring system are implemented in other or the same storage registers in the digital computer. The time delay means is arranged so as to include a second integrator and a negative feedback means including a summing junction in order that the time delay means may more readily be implemented in other or the same registers of the digital computer.

The "predicted following error" output of the first integration means is compared to a signal referred to as the "actual following error" in order to obtain an output signal referred to as the "monitor error". In operation, if the monitor error is greater than a predetermined threshold error, a command signal causes the position loop to stop the movement of the machine.

DESCRIPTION OF THE PREFERRED EMBODIMENT

Figure 1:
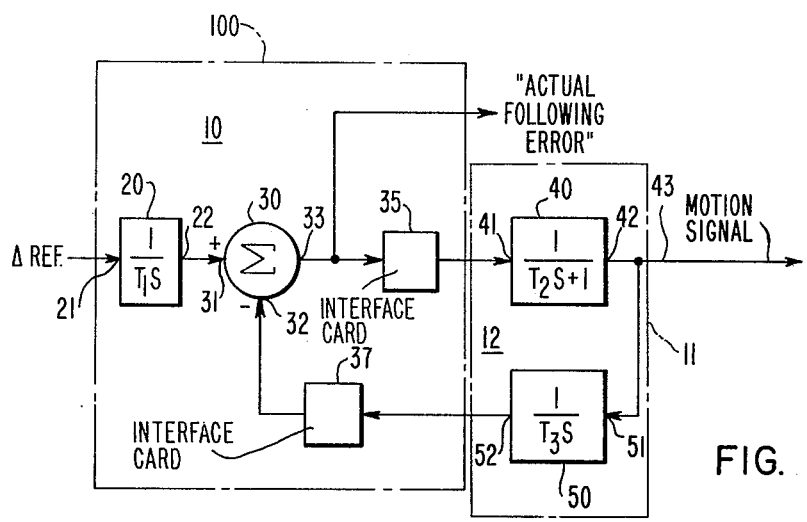
FIG. 1 is a block diagram of a common position loop of a numerical control system.

FIG. 1 shows a simplified time domain block diagram of a common type of position control 10 for controlling motion along one axis in a machine within the lines at 11 or other device having a moving part, for example a grinding machine. Specifically, position control 10 includes an integrator 20 for integrating a position command signal $\Delta$ref and for providing an output signal indicative thereof. The signal $\Delta$ref referred to herein is not the actual command signal itself but is the change in the actual command signal for each time period of the timing clock of the digital computer 100. A summing junction 30 having inputs 31 and 32 and having an output 33 is provided for summing or accumulating signals coupled to the inputs 31 and 32, including the output signal of the integrator 20. In the machine 11, a time delay means 40 having an input 41 and an output 42 represents the major inherent time delays in the mechanical systems of the machine 11 including that of any gears, field and/or armature time delays of any motors, or that of other mechanical parts. Negative feedback means 12 including an integrator 50 having an input 51 and an output 52 representing the actual physical motion of an axis of the machine 11, for example a motor shaft, are provided for feeding back a motion signal to the summing junction 30 where it will be summed by the summing means 30 along with the output signal of the integrator 20. An "actual following error" signal is generated at the output of the summing junction 30 and is taken to be the difference between the commanded drive position and the actual drive position of the machine 11 which the position control 10 governs.

According to the teachings of the present invention, integrator 20 and summing junction 30 are implemented for each axis in machine 11 in the registers of a digital computer within the dashed lines at 100. An interface card 35 is provided in the computer 100 for converting the digital output signal of the summing junction 30 to an equivalent analog signal suitable for causing motion in an axis of machine 11. Conversely, an interface card 37 is provided in the feedback loop 12 for converting the analog output signal from the integrator 50 into an equivalent digital signal suitable for summing by the digital summing junction 30. However, while such an embodiment is preferred, the integrator 20 may be implemented in any number of ways according to the teachings of the present invention, for example, in analog fashion by using an operational amplifier in a well-known capacitive feedback circuit configuration, so long as it is capable of integrating an electrical signal. Moreover, the summing junction 30 may be implemented in any number of ways, for example, in analog fashion by using an operational amplifier in a well-known resistive feedback configuration, so long as it is capable of summing electrical signals having different signs or polarities.

Figure 2:
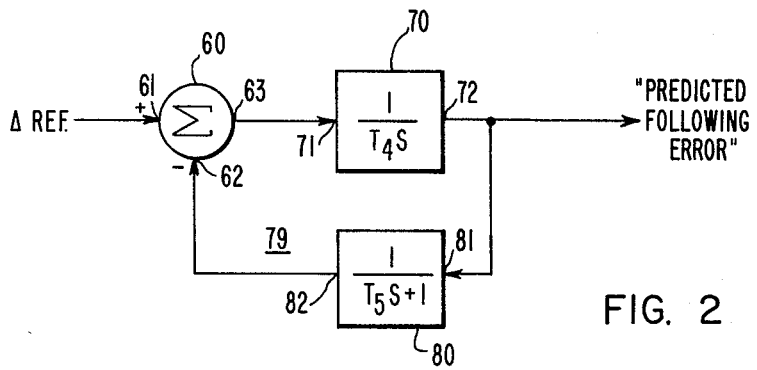
FIG. 2 is a block diagram of an embodiment of a position loop according to the teachings of the present invention.

FIG. 2 shows a simplified block diagram of a following error monitoring system according to the teachings of the present invention. A summing junction 60 having inputs 61 and 62 and having an output 63 is provided for summing or accumulating signals coupled to the inputs 61 and 62, including the command signal Δref and for providing an output signal indicative thereof on output 63. An integrator 70 having an input 71 and an output 72 is provided for integrating the output signal of the summing junction 60 and thereby providing an output signal indicative of a "predicted following error".

Feedback means 79 including a time delay means 80 having an input 81 and an output 82 are provided for feeding back the output of the integrator 70 to the summing junction 60 where it will be summed by the summing junction 60 along with the command signal Δref. Preferably, the summing junction 60 and the integrator 70 each include a register in the digital computer 100 of FIG. 1. But, consistent with the scope of the present invention, they may be implemented by any of the means discussed above in reference to the summing junction 30 and the integrators 20 of FIG. 1. The time delay means 80 is structurally similar to the time delay means 40 of FIG. 1 and, while preferably implemented in registers of the digital computer 100, may be implemented by any of the means hereinbefore discussed; and, in analog fashion, may be implemented by an operational amplifier having a resistive-capacitive feedback configuration.

Figure 3:
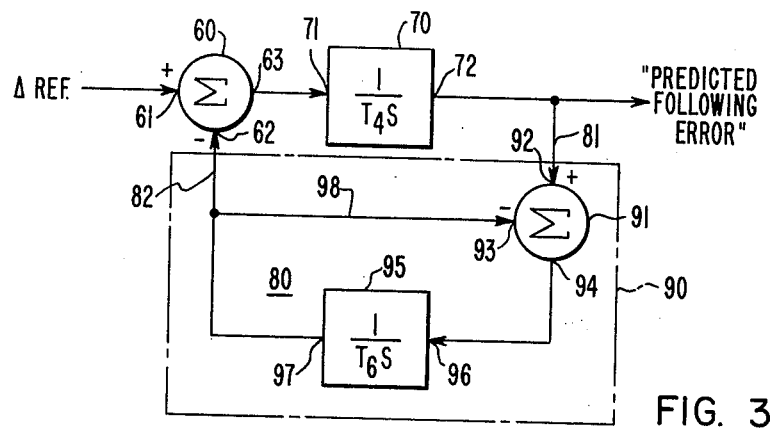
FIG. 3 is a block diagram of another embodiment of a position loop according to the teachings of the present invention.

A block diagram of an arrangement is shown within the dashed lines at 90 in FIG. 3 for implementing the time delay means 80 of FIG. 2. The arrangement 90 includes a summing junction 91 for summing electrical signals at inputs 92 and 93 including the output signal of integrator 70 and for providing an output signal indicative thereof at an output 94. An integrator 95 having an input 96 and having an output 97 is included for integrating the output signal of the summing junction 91 and providing an output signal indicative thereof. Additionally, feedback means are provided for feeding back the output signal of the integrator 95 to the input 93 of the summing junction 91. The summing junction 91 and the integrator 95 each preferably include a register in the digital computer 100 of FIG. 1. But, consistent with the scope of the present invention, these may be implemented by any of the means discussed above in reference to the summing junctions 30 and the integrators 20 of FIG. 1. A particular benefit of implementing the time delay means 80 of FIG. 2 in accordance with the arrangement 90 of FIG. 3 is that the arrangement 90 of FIG. 3 can be more easily implemented solely using registers and a clock in a digital computer.

Figure 4:
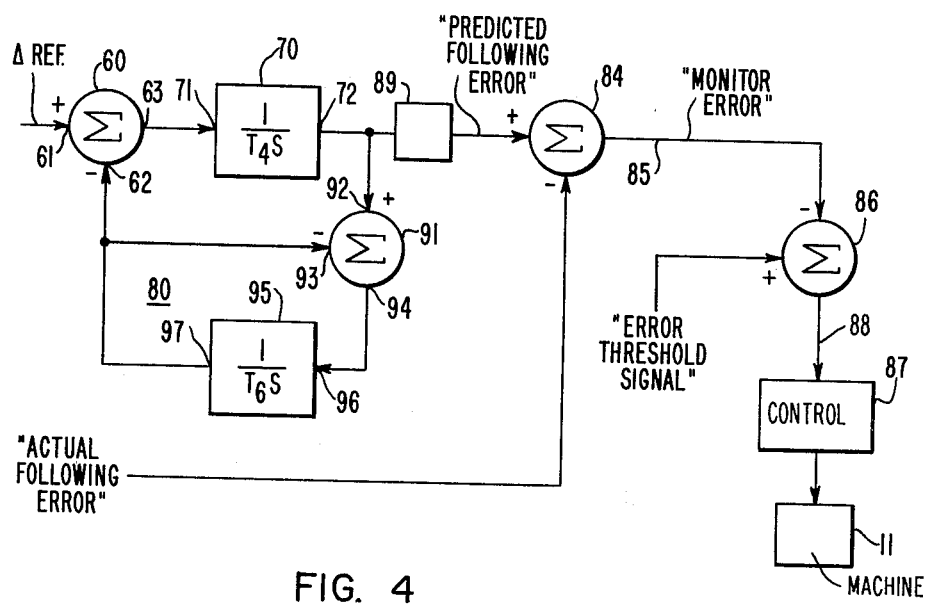
FIG. 4 is a block diagram of the position loop of FIG. 3 and further includes signals for operating the position loop of FIG. 3 according to the teachings of the present invention.

FIG. 4 shows the block diagram of FIG. 3 and further includes means 84 for comparing the output of the integrator 70 which is referred to herein as the "predicted following error" with the "actual following error" of the position control of FIG. 1 in order to provide a signal 85 indicative of what is referred to herein as a "monitor error".

In accordance with the operation of the present invention, means 86 are provided for comparing the absolute value of the monitor error signal 85 of FIG. 4 with an "error threshold signal" having a predetermined value of voltage and for providing an output signal indicative of the result of the comparison in order to determine if the value or level of the "monitor error signal" is excessive. In actual implementation, means 86 includes, for example, means for subtracting the absolute value of the "monitor error signal" from the "error threshold signal" and for providing an output signal 88 indicative thereof. Control means 87 are included for causing the machine 11 of FIG. 1 to stop in response to signal 88 if the "monitor error signal" is determined to be excessive, that is, if it is determined to be greater than or equal to the "error threshold signal".

In order to achieve optimal performance from the monitor system of FIGS. 3 and 4, certain adjustments must be performed to "tune" the circuit for each axis controlled. A gross adjustment is performed by adjusting the gain of an amplifier 89 such that the "monitor error" signal 85 is zero under steady-state conditions, that is under conditions where there is minimal or no change in machine speed. A fine adjustment is made by adjusting the gain of the integrators such that any overshoot or undershoot of the "predicted following error" signal is at a minimum at speed change points, for example, when the machine starts or stops.

What is claimed is:

1. A position monitoring system for monitoring the position of an axis in a machine controlled by a numerical control system and for providing a predicted following error signal indicative thereof, said numerical control system having a position control system for providing an output command signal, said position monitoring system comprising:

first integration means for providing said predicted following error signal as an output;

time delay means for time delaying the output of said integration means and for providing an output delay signal indicative of said time delayed output; and negative feedback means for feeding back said time delay signal to said integration means, said negative feedback means including first summing means for summing a junction of said output command signal and the negative of said output delay signal.

2. A system according to claim 1 wherein said delay means includes:

a second summing means for summing electrical signals, one of said electrical signals including the output of said first integration means;

a second integration means for integrating the output of said second summing means; and negative feedback means for feeding back the output of said second integration means to said second summing means such that the output of said second summing means is the difference between the outputs of said first and second integration means.

3. In a numerical control system having a command signal as an output, a monitoring system comprising:

first and second signal integration means each having an output, the output of said first integration means being predictive of following error;

a first summing means for providing to said first integration means an output signal indicative of the difference between the command signal and the output of said second integration means; and a second summing means for providing to said second integration means an output signal indicative of the difference between the output of said first and second integration means.

4. A digital monitoring system for monitoring a machine, the movement of which machine is governed by a command signal from a numerical control system, said digital monitoring system comprising:

first and second signal integration means each having an output, the output of said first integration means being predictive of machine following error;

a first summing means for providing to said first integration means an output signal indicative of the difference between the command signal and the output of said second integration means; and a second summing means for providing to said second integration means an output signal indicative of the difference between the output of said first and second integration means.

5. In a computer for providing numerical control for a device, a monitoring system for monitoring the movement of the device, said monitoring system having as an input a command signal governing the movement of the device and comprising:

first and second signal integration means each having an output, the output of said first integration means being predictive of device following error;

a first summing means for providing to said first integration means an output signal indicative of the difference between the command signal and the output of said second integration means; and a second summing means for providing to said second integration means an output signal indicative of the difference between the output of said first and second integration means.

6. A monitoring system according to claim 5 wherein: said computer is a digital computer;

said first and second integration means each include a register in said digital computer; and said first and second summing means each includes a register in said computer.

7. In a digital computer, a system comprising:

numerical control means having a position control system for controlling motion in an axis of a machine in response to a command signal, said position control system including first storage registers in said digital computer and providing a first error signal;

a position feedback loop in said digital computer including second storage registers in said digital computer for providing a second error signal in response to the command signal, said second error signal being predictive of said first error signal; and stopping means for arresting motion in said machine when the difference between said first and second error signals exceeds a predetermined threshold.

8. A system according to claim 7 wherein said position feedback loop comprises:

first integration means for integrating the command signal and providing an output signal indicative thereof;

time delay means for time delaying the output of said first integration means and for providing a delay signal indicative thereof; and feedback means for feeding back said delay signal to said first integration means.

9. A system according to claim 8 wherein said time delay means comprises:

a second integration means having an output;

a first summing means for providing to said first integration means an output signal indicative of the difference between the command signal and the output of said second integration means; and a second summing means for providing to said second integration means an output signal indicative of the difference between the output of said first and second integration means.

10. A system according to claim 9 wherein said stopping means comprises:

first means for comparing the first error signal to the second error signal and generating a comparison signal responsive to the difference between the two error signals;

second means for comparing the comparison signal to a threshold signal and generating an output signal indicative of an excessive difference between the two error signals; and means responsive to the output from said second comparing means for halting motion of said machine.

* * * * *